US007280963B1

(12) United States Patent
Beaufays et al.

(10) Patent No.: US 7,280,963 B1
(45) Date of Patent: Oct. 9, 2007

(54) METHOD FOR LEARNING LINGUISTICALLY VALID WORD PRONUNCIATIONS FROM ACOUSTIC DATA

(75) Inventors: Francoise Beaufays, Mountain View, CA (US); Ananth Sankar, Palo Alto, CA (US); Mitchel Weintraub, Cupertino, CA (US); Shaun Williams, San Jose, CA (US)

(73) Assignee: Nuance Communications, Inc., Menlo Park, CA (US)

( * ) Notice: Subject to any disclaimer, the term of this patent is extended or adjusted under 35 U.S.C. 154(b) by 926 days.

(21) Appl. No.: 10/660,868

(22) Filed: Sep. 12, 2003

(51) Int. Cl.
*G10L 15/06* (2006.01)
*G10L 15/10* (2006.01)

(52) U.S. Cl. .................. 704/236; 704/240; 704/243

(58) Field of Classification Search ............. 704/231, 704/236, 238, 239, 240, 243, 244, 251, 252, 704/254
See application file for complete search history.

(56) References Cited

U.S. PATENT DOCUMENTS

| 5,857,173 | A * | 1/1999 | Beard et al. .............. 704/276 |
| 5,987,409 | A * | 11/1999 | Tran et al. ................ 704/240 |
| 6,076,053 | A * | 6/2000 | Juang et al. .............. 704/236 |
| 6,078,885 | A * | 6/2000 | Beutnagel ................ 704/258 |
| 6,233,553 | B1 * | 5/2001 | Contolini et al. ......... 704/220 |
| 6,236,965 | B1 * | 5/2001 | Kim et al. ................ 704/254 |
| 6,272,464 | B1 * | 8/2001 | Kiraz et al. .............. 704/257 |
| 6,389,394 | B1 * | 5/2002 | Fanty ...................... 704/249 |
| 6,411,932 | B1 * | 6/2002 | Molnar et al. ............ 704/260 |
| 6,963,841 | B2 * | 11/2005 | Handal et al. ............ 704/270 |
| 7,113,908 | B2 * | 9/2006 | Goronzy et al. .......... 704/244 |
| 2002/0046025 | A1 * | 4/2002 | Hain ....................... 704/243 |
| 2003/0088415 | A1 * | 5/2003 | Kobal et al. ............. 704/251 |
| 2006/0143008 | A1 * | 6/2006 | Schneider et al. ....... 704/251 |

OTHER PUBLICATIONS

Beaufays, F. et al. (2003). "Learning Linguistically Valid Pronunciation From Acoustic Data," Nuance Communications, Eurospeech 2003- Geneva, 2593-2596.
Beaufays, F. et al. (2003). "Learning Name Pronunciations in Automatic Speech Recognition Systems," Nuance Communications, 15th International Conference on Tools with Artificial Intelligence, 233-240.

* cited by examiner

*Primary Examiner*—Martin Lerner
(74) *Attorney, Agent, or Firm*—Townsend and Townsend and Crew LLP

(57) ABSTRACT

A computerized method is provided for generating pronunciations for words and storing the pronunciations in a pronunciation dictionary. The method includes graphing sets of initial pronunciations; thereafter in an ASR subsystem determining a highest-scoring set of initial pronunciations; generating sets of alternate pronunciations, wherein each set of alternate pronunciations includes the highest-scoring set of initial pronunciations with a lowest-probability phone of the highest-scoring initial pronunciation substituted with a unique-substitute phone; graphing the sets of alternate pronunciations; determining in the ASR subsystem a highest-scoring set of alternate pronunciations; and adding to a pronunciation dictionary the highest-scoring set of alternate pronunciations.

28 Claims, 10 Drawing Sheets

METHOD FOR LEARNING LINGUISTICALLY VALID WORD PRONUNCIATIONS FROM ACOUSTIC DATA

The following related patent applications filed on the same day herewith are hereby incorporated by reference in their entirety for all purposes:

U.S. patent application Ser. No. 10/661,431, filed 12 Sep. 2003, titled "Method for Learning Linguistically Valid Word Pronunciations from Acoustic Data," of Francoise Beaufays et al.;

and U.S. patent application Ser. No. 10/661,106, filed 12 Sep. 2003, titled "Method for Learning Linguistically Valid Word Pronunciations from Acoustic Data," of Francoise Beaufays et al.

BACKGROUND OF THE INVENTION

This invention relates generally to generating phonetic spellings of words, and more specifically to a method and apparatus for generating phonetic spellings of words that are collected in a pronunciation dictionary, such that the phonetic spellings are generated by a pronunciation-learning module configured to accept as input a list of words and transcribed acoustic data that includes acoustic samples of words spoken by a set of speakers and the transcribed words therefor.

Automatic speech recognition systems and speech synthesis systems are being deployed in a broad variety of government, business, and personal applications. Such systems provide simplified, automated communication between people and computers. Constructing automatic speech recognition (ASR) systems and speech synthesis systems is a laborious process performed by experts in the fields of linguistic modeling and acoustic modeling. The creation of given aspects of ASR systems and speech synthesis systems has been automated to some extent, such as by automatic generation of pronunciation dictionaries. Pronunciation dictionaries typically include phonetic spellings (or "pronunciations") of words spelled with the phones of a phonetic alphabet. Pronunciation dictionaries and their pronunciations can be used by both ASR systems and speech synthesis systems to facilitate communication between people and computers. For example, ASR systems can be configured to compare an acoustic waveform of a spoken word against a set of pronunciations in a pronunciation dictionary to determine whether the spoken word matches one or more of the pronunciations. In matching spoken words to pronunciations, meanings can be extracted from the spoken words and can be used to direct a computer or machine to perform a requested task, such as dialing a telephone extension, making a bank deposit or other task. Speech synthesis systems can be configured to use a pronunciation dictionary by electronically articulating words according to their pronunciations in the pronunciation dictionary. For example, in an automated telephone dialing system, a speech synthesis system can be configured to articulate names or other words as they are phonetically spelled in a pronunciation dictionary.

One automated method of generating pronunciation dictionaries includes the use of letter-to-phone engines configured to match sequences of phones to sets of alphabetic letters of a spelled word. While letter-to-phone engines have been used with some success to generate pronunciations of simple words, more complicated words, such as given names and surnames, do not lend themselves as easily to letter-to-phone matching to generate valid pronunciations. For example, an American speaker is likely to pronounce the first inventor's surname, Beaufays, as [b u f e] (Computer Phonetic Alphabet spelling), a French speaker is likely to say [b o f e], and a French-speaking Belgian will likely say [b o f A i]. A letter-to-phone engine is likely to generate a pronunciation not matching any of the above pronunciations due, for example, to the silence of given letters in the spoken name and varied pronunciations of letter groups.

Linguists are often employed to verify and adjust pronunciations generated by letter-to-phone engines. However, the use of trained linguists to correct pronunciations is relatively costly and relatively slow. For example, a well-trained linguist may be able to generate and/or correct the pronunciations of about 65 to 85 words per hour. If, however, a linguist does not have access to acoustic samples of the words for which corrected pronunciations are desired, the linguist may be unable to correct those pronunciations. Moreover, if a linguist is not trained in a given foreign language or a given dialect of a foreign language, the linguist may be unable to verify and correct pronunciations, including especially given names and surnames. As the demand for larger and relatively more accurate ASR systems and speech synthesis systems increases, so too does the demand for larger and relatively more accurate pronunciation dictionaries increase. Correspondingly, demand also increases for automated systems and techniques to produce pronunciation dictionaries that are relatively less costly to generate, relatively fast, and configured to generate relatively accurate pronunciations.

What is needed specifically are automated development methods and systems that provide automated generation of pronunciations that relatively accurately match acoustic samples of words spoken by a set of speakers.

SUMMARY OF THE INVENTION

According to the invention a computerized method is provided for generating pronunciations for words that are represented by waveforms and text using conditional probability techniques. According to one embodiment, the method includes graphing sets of initial pronunciations; thereafter in an ASR subsystem determining a highest-scoring set of initial pronunciations; generating sets of alternate pronunciations, wherein each set of alternate pronunciations includes the highest-scoring set of initial pronunciations with a lowest-probability phone of the highest-scoring initial pronunciation substituted with a unique-substitute phone; graphing the sets of alternate pronunciations; determining in the ASR subsystem a highest-scoring set of alternate pronunciations; and adding to a pronunciation dictionary the highest-scoring set of alternate pronunciations. According to a specific embodiment, the method includes weighting the sets of initial pronunciations with linguistic probabilities. According to another specific embodiment, the linguistic probabilities are calculated according to a transformation probability $P(B_i|A)$, wherein $B_i$ and $A$ represent respective sequence of phones for respective sets of pronunciations.

According to another embodiment, the method includes graphing sets of initial pronunciations; thereafter in an ASR subsystem determining a highest-scoring set of initial pronunciations; generating a set of alternate pronunciations that includes the highest-scoring set of initial pronunciations with a lowest-probability phone of the highest-scoring initial pronunciation substituted with a unique-substitute phone; and adding to a pronunciation dictionary the set of alternate pronunciations and the highest-scoring set of initial pronunciations. According to a specific embodiment, the method further includes traversing branches of the graph to generate scores for the sets of initial pronunciations. According to another specific embodiment, the method further includes in the ASR subsystem generating transcriptions of acoustic data spoken by a plurality of speakers, wherein the transcriptions are included in the transcribed acoustic data. According to another specific embodiment, the method further includes in the ASR subsystem collecting feedback from the plurality of speakers to affirm or disaffirm correct generation of the transcriptions, wherein if the transcriptions are affirmed as correct then the transcriptions are entered in the transcribed acoustic data.

Various embodiments employ conditional probability techniques wherein lower probability solutions are discarded and other solutions are substituted in order to obtain more refined matches.

The invention will be better understood upon reference to the following detailed description in connection with the accompanying drawings and appended claims.

DESCRIPTION OF SPECIFIC EMBODIMENTS

Figure 1:
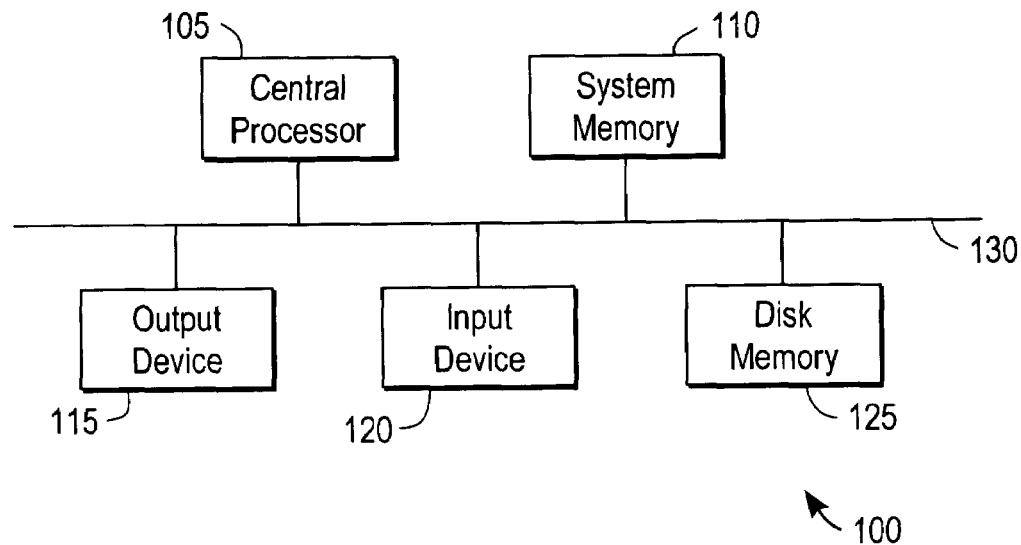
FIG. 1 is a block diagram of a computer system in which the invention may be embodied.

FIG. 1 is a block diagram of a computer system 100 in which embodiments of the present invention may be implemented. A specific embodiment of the invention is implemented on a computer system 100 having a processor 105, a system memory 110, an output device 115, an input device 120, a disk memory 125, and an interconnecting device 130, such as a system bus. Processor 105 may be implemented in a variety of formats, such as, but not limited to, a microprocessor, a microcontroller, a microcomputer, embedded logic or other processor types. Processor 105 may be a microprocessor manufactured, for example, by Intel Corporation, Motorola, Inc., or Advanced Micro Devices, Inc. System memory 110 may include EPROMs, EEPROMS, flash memory, SRAMs, DRAMs, cache memory or the like. Output device 115 may be one of a variety of device types, such as CRTs, liquid-crystal display panels, printers, computer networks, an audio playback device and the like. Input device 120 may be one of a variety of input types, such as a microphone, a keyboard, a computer network and the like. A computer software program stored on system memory 110 and/or disk memory 125 is configured to generate machine code instructions that implement embodiments of the present invention.

Figure 2:
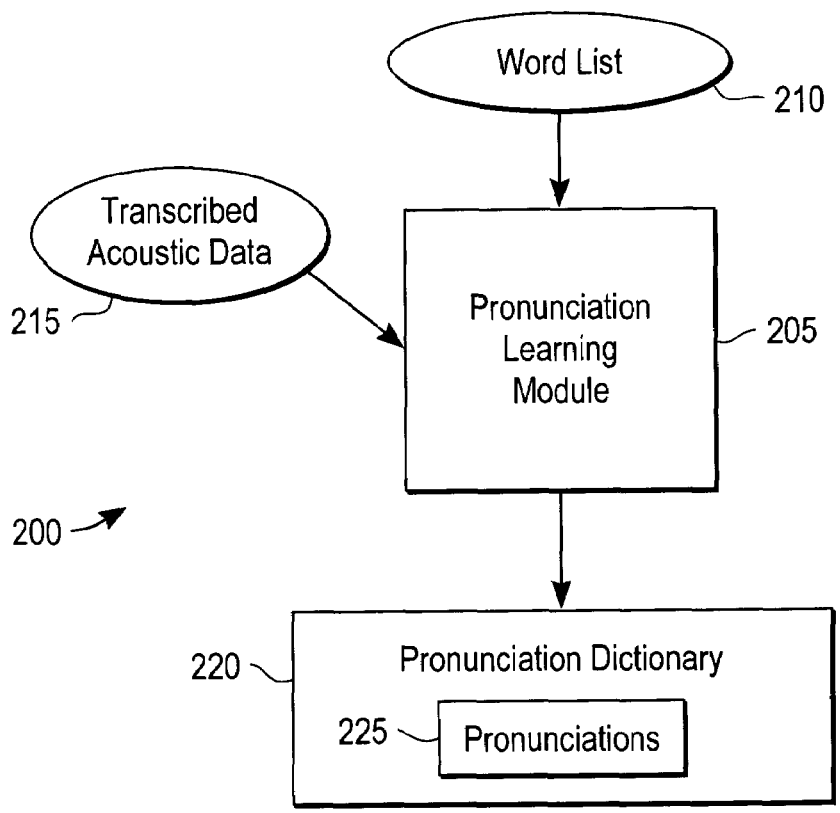
FIG. 2 is a simplified block diagram of a pronunciation system illustrating a flow of information for generating entries in a pronunciation dictionary according to an embodiment of the present invention.

FIG. 2 is a simplified block diagram of a pronunciation system 200 according to an embodiment of the present invention illustrating a flow of information for generating phonetic spellings (or "pronunciations"). Pronunciation system 200 may be implemented in software, firmware, control logic, hardware or a combination of the foregoing. Those of skill in the art will know of other useful ways to implement pronunciation system 200. Pronunciation system 200 includes a pronunciation-learning module 205, a word list 210, transcribed acoustic data 215, and a pronunciation dictionary 220, which includes a set of pronunciations 225.

Word list 210 includes a list of words for which pronunciations are desired. According to a specific embodiment, word list 210 includes a list of names, such as a list of given names and/or surnames. However, word list 210 is not limited to including names and may include any word for which pronunciations are desired. For example, word list 210 may also include multiwords. Multiwords are words that are run together when spoken. Examples of multiwords include "wanna" for "want to" and "gotta" for "got to."

Transcribed acoustic data 215 includes acoustic data for words contained in word list 210. Transcribed acoustic data includes, for example, acoustic data for words spoken by a set of speakers (i.e., one or more speakers) or a representation of a set of speakers (e.g., an analog magnetic recording or a digital optical recording). The acoustic data may include waveforms, such as a digitized waveforms. Transcribed acoustic data may further include a list of transcribed words associated with the acoustic data.

Figure 3:
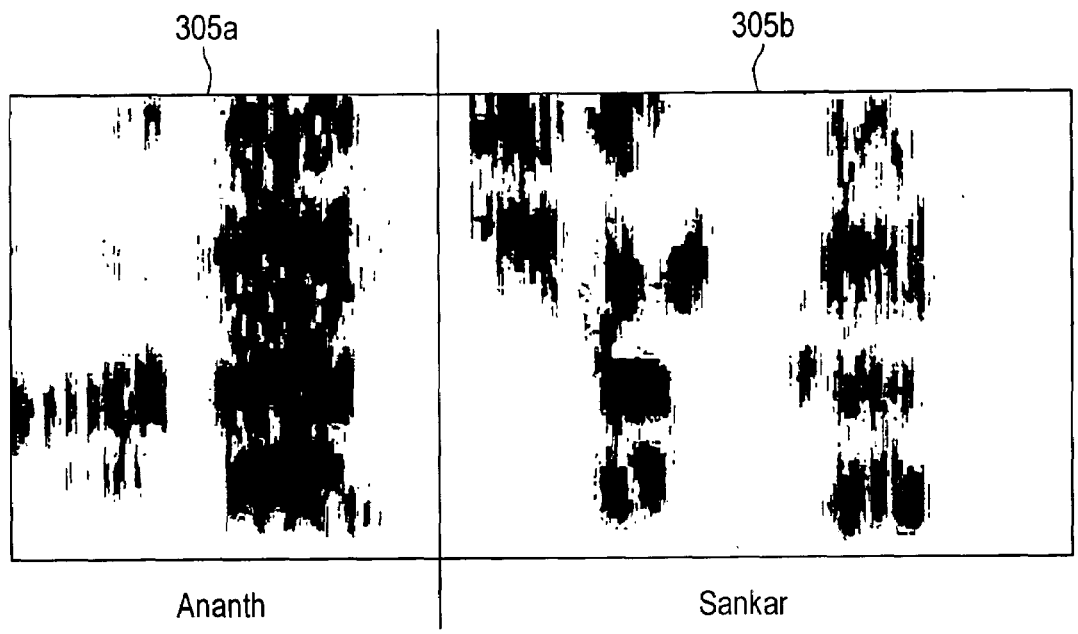
FIG. 3 shows a waveform and transcribed words therefore according to an embodiment of the present invention.

FIG. 3 shows an example of a portion of acoustic data that may be included in transcribed acoustic data 215. The acoustic data includes waveforms 305a and 305b, which are portions of a waveform 300. Waveform 300 may include additional waveform portions (not shown) representing other spoken words. Waveforms 305a and 305b are shown in the time-amplitude domain, wherein the horizontal axis represents time and the vertical axis may represent acoustic intensity, acoustic amplitude, acoustic power or the like. Waveforms 305a and 305b represent the second named inventor's given name, Ananth, and surname, Sankar, respectively.

According to one embodiment, transcribed words are included in transcribed acoustic data 215 and are transcribed by a person who listens to a set of acoustic data and transcribes the words. Subsequent to transcription, the transcribed words are combined with the acoustic data to generate the transcribed acoustic data.

Alternatively, an automatic speech recognition (ASR) system may be configured to transcribe the transcribed words included in the transcribed acoustic data. Some words generated by an ASR system may not match the words spoken by speakers. To prevent pronunciation system 200 from learning incorrect words, words generated by an ASR system may be assigned confidence numbers. Words assigned confidence numbers below a threshold value may be removed from the transcribed acoustic data. Alternatively, words that appear with a frequency that is below a threshold value may similarly be removed from the transcribed acoustic data.

According to another alternative, the transcribed words included in the transcribed acoustic data may be generated by collecting acoustic data spoken by a set of speakers wherein the speakers provide feedback as to whether an ASR system has correctly recognized the words spoken. For example, a speaker may be prompted by the ASR system to say the name of a person the speaker would like to call, e.g., "who would you like to call." A speaker giving the answer "Francoise Beaufays" may then be asked "Do you want to call Francoise Beaufays?" If the speaker answers "yes", then the acoustic data collected from the speaker along with the recognized words may be entered in the transcribed acoustic data. Alternatively, if the ASR system asks the speaker "would you like to call Mitchel Weintraub," the speaker would answer "no." The feedback from the speaker indicates the ASR system has incorrectly recognized the words spoken. Accordingly, the acoustic data with the transcribed words "Mitchel Weintraub" will not be included in the transcribed acoustic data. Although the above feedback examples include the speaker answering a question in the affirmative (e.g., yes) or negative (e.g., no), other feedback may be collected. For example, the speaker's silence in response to the ASR system saying "calling Francoise Beaufays," may be an indication the ASR system correctly recognized the words spoken by the speaker, and the acoustic data and words generated by the ASR system may be entered in the transcribed acoustic data. Alternatively, if the speaker interrupts the ASR system after the system says "calling Mitchel Weintraub," the interruption may be taken as an indication of an incorrect match, and the acoustic data and words generated by the ASR system may not be entered in the transcribed acoustic data. Other useful feedback may be collected from a speaker to confirm or disaffirm correct word recognition by the ASR system. Those of skill in the art will recognize other useful ways to generate transcribed acoustic data for use with pronunciation system 200.

Referring again to FIG. 2, pronunciation-learning module 205 is configured to receive as input word list 210 and transcribed acoustic data 215. The pronunciation-learning module is configured to apply the received input to generate pronunciations 225. As briefly mentioned above, a "pronunciation," as referred to herein, includes a phonetic spelling of a word spelled in a sequence of phones from a phonetic alphabet. Examples of useful phonetic alphabets include the International Phonetic Alphabet (IPA) having a set of IPA phones and the Computer Phonetic Alphabet (CPA) having a set of CPA phones. Table 1 shows an exemplary copy of the IPA of the International Phonetic Association. The CPA includes primarily ASCII characters rather than the more stylized fonts of the IPA. For convenience, pronunciations herein are spelled with CPA phones.

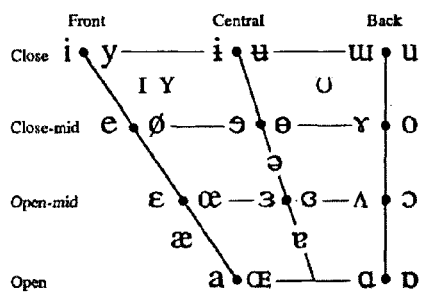
Table 1

The IPA includes the suggested pronunciation for each IPA phone. The IPA shown in Table 1 is one example of a phonetic alphabet for phonetically spelling pronunciations 225. Other useful phonetic alphabets may be employed with the invention.

Figure 4:
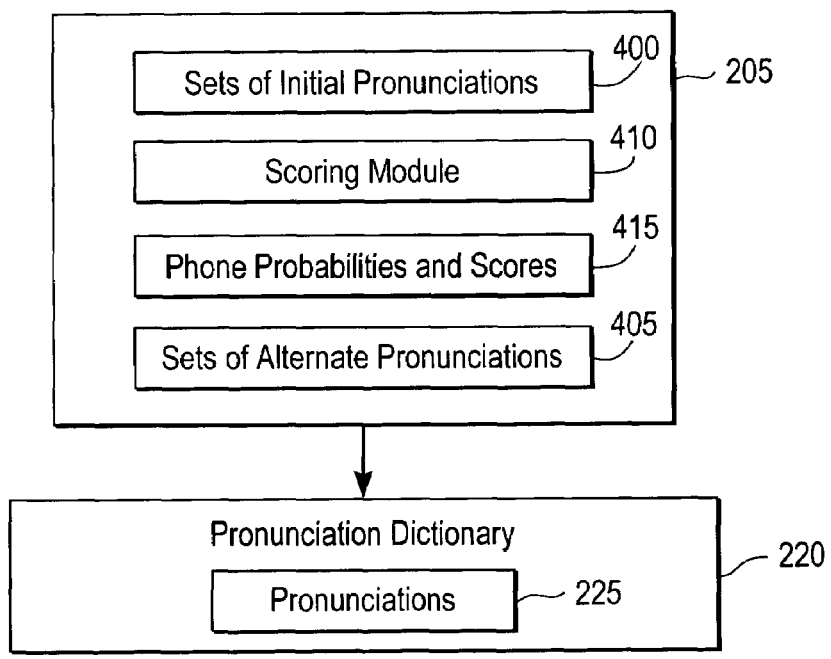
FIG. 4 is a simplified block diagram of a pronunciation-learning module according to an embodiment of the present invention.

FIG. 4 is a block diagram of pronunciation-learning module 205 shown in further detail according to an embodiment of the present invention. Pronunciation-learning module 205 includes sets of initial pronunciations 400, sets of alternate pronunciations 405, a scoring module 410, and a set of phone probabilities and scores 415.

Sets of initial pronunciations 400 include initial pronunciations matched to words in transcribed acoustic data 215. For example, a transcription of words in the transcribed acoustic data may include "call Ananth Sankar." Examples of initial pronunciation for these words are shown in the left column of Table 2. Six sets of initial pronunciations (numbered 1-6) constructed from the initial pronunciation are shown in the right column of Table 2.

TABLE 2

| call → | [k O l] | (1) | [k O l][* n A n T][s a n k * r] |
|---|---|---|---|
| | | (2) | [k O l][a n a n T][s a n k * r] |
| Ananth → | [* n A n T] | (3) | [k O l][* n A n T][s * n k * r] |
| | [a n a n T] | (4) | [k O l][a n a n T][s * n k * r] |
| | | (5) | [k O l][* n A n T][s * g~k * r] |
| Sankar → | [s a n k * r] | (6) | [k O l][a n a n T][s * g~k * r] |
| | [s * n k * r] | | |
| | [s * g~k * r] | | |

According to one embodiment, sets of initial pronunciations are constructed from all combinations of the initial pronunciations. While the left column of Table 2 shows example sets of initial pronunciations that include multiple pronunciations, as referred to herein, a set of initial pronunciations may include a single pronunciation. For example, if a speaker says "Ananth" when prompted to say the person's name that the speaker wishes to call, two sets of initial pronunciations for the spoken word may include: [* n A n T] and [a n a n T].

Initial pronunciations from which sets of initial pronunciations 400 are constructed may be extracted from the pronunciation dictionary 220. Pronunciation dictionary 220 may include one or more initial pronunciations for a word. For example, the pronunciation dictionary may include the following initial pronunciations for the first named inventor's last name: [b u f e], [b o f e], and [b o f A i].

Figure 5:
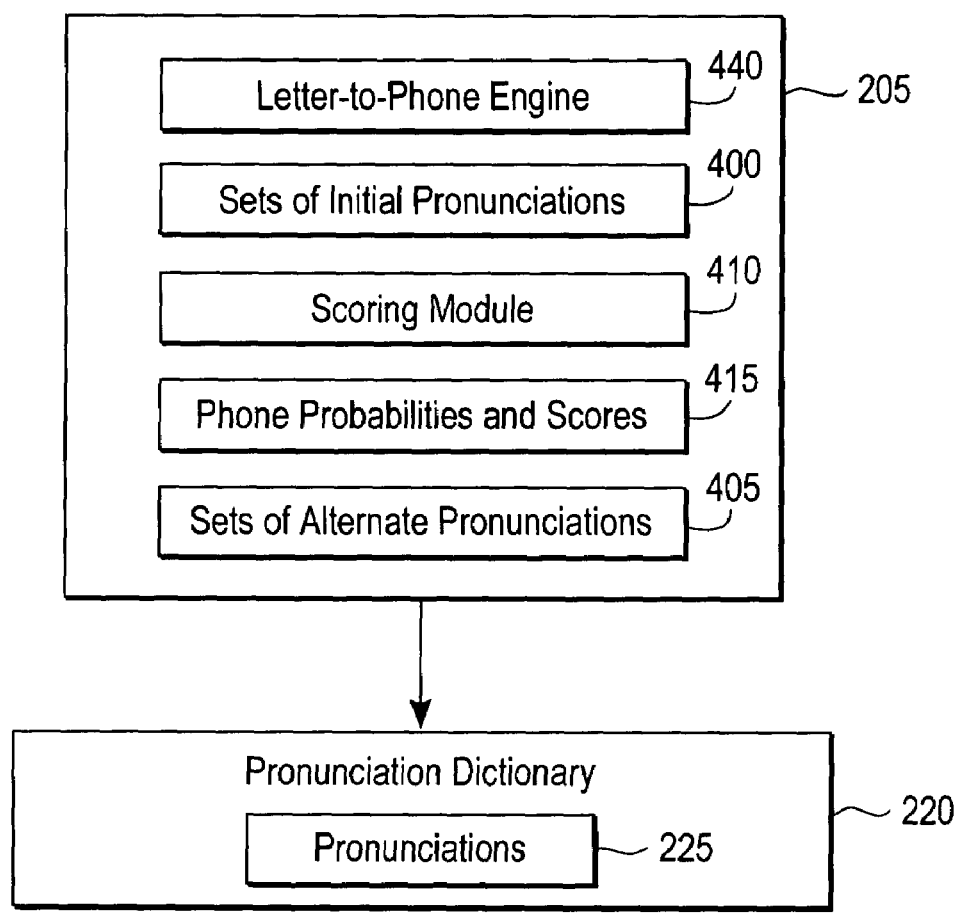
FIG. 5 is a simplified block diagram of a pronunciation-learning module according to another embodiment of the present invention.

Alternatively, a letter-to-phone matching system, such as a letter-to-phone engine, may be used to generate the initial pronunciations from which the sets of initial pronunciations are to be constructed. FIG. 5 shows a pronunciation-learning module 205' that includes a letter-to-phone engine 440 according to an embodiment of the present invention. Letter-to-phone engine 440 is configured to generate initial pronunciations using the alphabetic spellings of words in word list 210 (FIG. 2) or transcribed words in the in transcribed acoustic data 215. For example, the alphabetic spelling of the second inventor's name, as it may appear in word list 210, is Ananth Sankar. Letter-to-phone engine 440 on receiving the alphabetic spelling Ananth Sankar may generate an initial pronunciation for Ananth that includes [* n A n T] and may generate initial pronunciations for Sankar that include [sank*r], [s a g~ k *r], and [s * g~ k A r].

According to another alternative, initial pronunciations may extracted from pronunciation dictionary 220 and generated by letter-to-phone engine 440. For example, letter-to-phone engine 440 may be used to generate initial pronunciations not included in the pronunciation dictionary and initial pronunciations that are included in the pronunciation dictionary may be extracted. According to another example, if pronunciation dictionary 220 includes relatively reliable initial pronunciations for some words but not for others, the relatively reliable initial pronunciations may be extracted from the pronunciation dictionary whereas other initial pronunciations may be generated by letter-to-phone engine 440. According to another example, letter-to-phone engine 440 may generate initial pronunciations that may be supplemented with initial pronunciations from the pronunciation dictionary where they exist. According to one embodiment, letter-to-phone engine 440 is the AUTOPRON™ software system created by Nuance Communications, Inc. of Menlo Park Calif., assignee of the present invention.

Figure 6A:
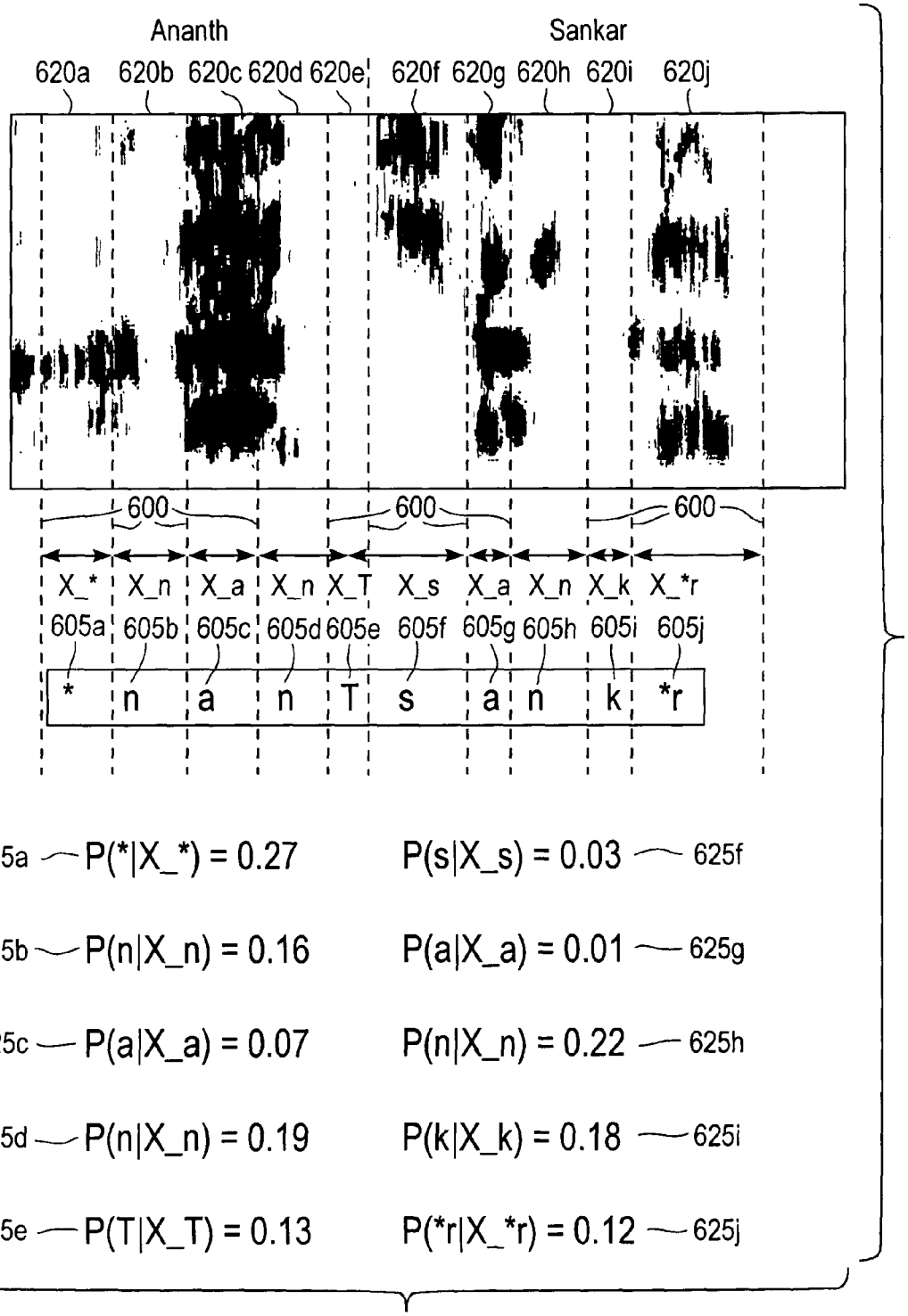
FIG. 6A shows an example of a phone sequence force-aligned to a waveform that represents a pair of words according to an embodiment of the present invention.

Subsequent to constructing sets of initial pronunciations 440, each set of initial pronunciations is then aligned (or "force-aligned") to a waveform corresponding to the sets of initial pronunciations. The waveform represents an acoustic sample of words spoken by a speaker. FIG. 6A shows an example of a set of initial pronunciations 600 that includes first and second initial pronunciations 605 and 610 force aligned to waveforms 305a and 305b, respectively. For convenience, the phones in initial pronunciations 605 and 610 are labeled from left to right with the reference numerals 605a-605j.

Waveform sections to which phones are force-aligned are referred to as acoustic segments of the waveform. The acoustic segments forming waveforms 305a and 305b are identified by the reference numerals 620a-620j. Dashed lines 600 indicate divisions between acoustic segments 620a-620j. The beginnings and endings of acoustic segments, such as the beginnings and endings of acoustic segments 620a-620j (i.e., locations of dashed lines 600), are set in a force-aligning process.

Subsequent to force-alignment, each set of initial pronunciations is scored (scoring is discussed in detail below) and a set of initial pronunciations having the highest score is identified (sometimes referred to as the highest-scoring set of initial pronunciations). For example, scores for the six sets of initial pronunciations in Table 2 may include the scores shown in Table 3.

TABLE 3

| (1) | [k O l][* n A n T][s a n k * r] | $score_1 = 5.1$ |
|---|---|---|
| (2) | [k O l] [a n a n T][s a n k * r] | $score_2 = 5.2$ |
| (3) | [k O l] [* n A n T][s * n k * r] | $score_3 = 3.6$ |
| (4) | [k O l] [a n a n T][s * n k * r] | $score_4 = 3.2$ |
| (5) | [k O l] [* n A n T][s * g~k * r] | $score_5 = 2.1$ |
| (6) | [k O l] [a n a n T][s * g~k * r] | $score_6 = 2.2$ |

Figure 6B:
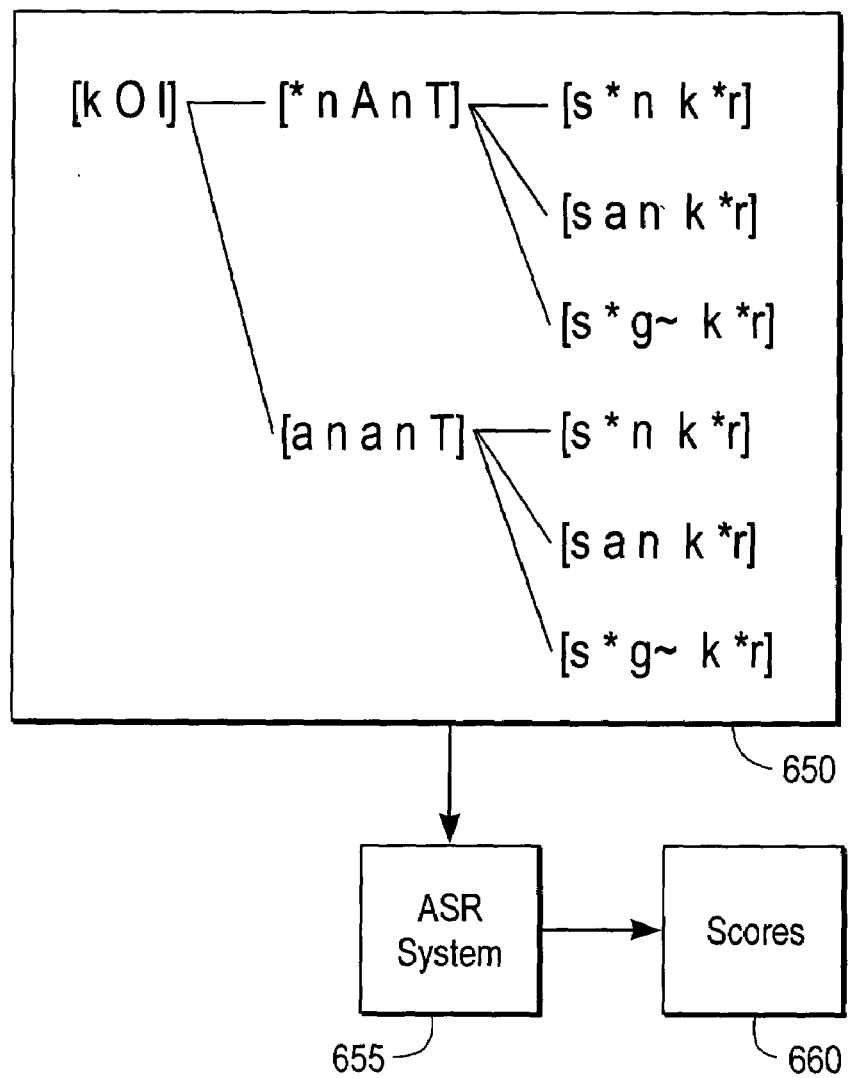
FIG. 6B is a graph of sets of initial pronunciations according to an embodiment of the present invention.

According to an alternate embodiment, rather than force-aligning each set of initial pronunciations to a waveform, the sets of initial pronunciations are graphed and entered into an ASR system, which is configured to score the sets of initial pronunciations. FIG. 6B shows an example graph 650 of the six sets of initial pronunciations that are shown in Table 2. An ASR system 655 may be configured to traverse the various branches of the graph to generate scores 660. Those of skill in the art are familiar with ASR systems configured to score graphed sets of pronunciations and such systems will not be described in further detail.

According to one embodiment, subsequent to identifying the highest-scoring set of initial pronunciations, phone probabilities are generated for each phone in that set. Phone probabilities are generated by scoring module 410 and represent probabilistic measures of an acoustic match between acoustic models representing the phones and the acoustic segments to which the phones are force-aligned. According to one embodiment, phone probabilities are calculated using a Bayesian statistical model. Bayesian statistical models are based on the premise that a first option is correct, and a second option is calculated in view of the premise. For example, phone probability P(a|X_a) 625c may be read as follows: P(a|X_a) is the probability of an acoustic model trained for the phone "a" given the acoustic segment X_a. Bayesian statistical models are well understood by those of skill in the art and will not be described in further detail. P(a|X_a) is also sometimes referred to as the posterior probability of "a" given "X_a".

Subsequent to the generation of the set of phone probabilities 415, the phone probabilities are compared to determine which phone probability has a lowest value. For convenience, a phone having the lowest phone probability is herein referred to as the lowest-probability phone. More than one phone may be identified as a lowest-probability phone if the phone probabilities of two or more phones are equal. In the example being considered, phone probabilities 625a-620j may have the following values: P(*|X_*)=0.27, P(n|X_n), P(a|X_a)=0.07, P(n|X_n)=0.19, P(T|X_T)=0.13, P(s|X_s)=0.03, P(a|X_a)=0.01, P(n|X_n)=0.22 P(k|X_k)=0.18, and P(*r|X_*r)=0.12, respectively. Phone 605g has the lowest phone probability 620g P(a|X_a)=0.01 and is identified as the lowest-probability phone.

According to one embodiment, phone probabilities are generated for a set of substitute phones. The substitute phones may include all phones in a phonetic alphabet or a subset thereof. A substitute phone having the highest-phone probability is identified and substituted for the lowest-probability phone in the highest-scoring set of initial pronunciations to generate a set of alternate pronunciations. For example, in the set of initial pronunciations [* n a n T] [s a n k *r] the phone "a" in [s a n k *r] is identified as the lowest-probability phone, P(a|X_a)=0.01. Phone probabilities for a set of substitute phones "!", "*", "A", "aj", "i" . . . etc., may be generated by the scoring module and found to be P(!|X_a)=0.01, P(*|X_a)=0.33, P(A|X_a)=0.25, P(aj|X_a)=0.19, P(i|X_a)=0.01 . . . etc. The substitute phone having the highest-phone probability is "*" with a phone probability of 0.33. A set of alternate pronunciations is then generated having the phone sequence [* n a n T] [s * n k *r]. While sets of alternate pronunciations have been characterized above as including multiple pronunciations, a set of alternate pronunciations as referred to herein may include a single alternate pronunciation.

Once generated, the set of alternate pronunciations is added to the pronunciation dictionary. According to one embodiment, if the set of initial pronunciations is in the pronunciation dictionary, the set of alternate pronunciations may replace the set of initial pronunciations. According to another embodiment, both the highest-scoring set of initial pronunciations and the set of alternate pronunciations are added to the pronunciation dictionary.

The above described process may be repeated a number of times using the set of alternate pronunciations as the highest-scoring set of initial pronunciations to generate a new set of alternate pronunciations. The newly generated set of alternate pronunciations may then be added to the pronunciation dictionary. For example, in the set of alternate pronunciations [* n a n T] [s * n k *r], the phone probability for phone "s" has the lowest probability, P(s|X_s)=0.03. A substitute phone for "s" might be "S" and a new set of alternate pronunciations may include the pronunciations [* n a n T] [S * n k *r], which may be added to the pronunciation dictionary. The above process may also be repeated for each acoustic sample of words supplied by the transcribed acoustic data. Repeating the above process provides a pronunciation dictionary having numerous pronunciations for words that have relatively refined acoustic matches to waveforms spoken by sets of speakers. Such pronunciation dictionary may be of use in an ASR system to recognize words spoken by a variety of speakers, such as speakers having a variety of accents. Moreover, the above process may be repeated for a number of initial pronunciations in a set of initial pronunciations. For example, in the set of initial pronunciations [* n a n T] [s a n k *r], the pronunciation [s a n k *r] had the lowest-probability phone and alternate pronunciations were generated for this initial pronunciation. Alternate pronunciations may also be generated for the initial pronunciation [* n a n T] as described above. This processes may be repeated for each initial pronunciation in a set of initial pronunciations or for a select subset of the initial pronunciations in a set of initial pronunciations.

According to one embodiment, sets of alternate pronunciations are generated, then force-aligned (or "realigned"; see FIG. 6A) to the waveform or graphed (see FIG. 6B), and scored to determine which of the sets of alternate pronunciations has a highest score. This embodiment differs from the embodiment described above in that the sets of alternate pronunciations in the embodiment described above are not realigned to the waveform or graphed. The embodiment is presently described in further detail.

Similar to the embodiment described above, a lowest-probability phone is identified in a highest-scoring set of initial pronunciations. However, rather than generating one set of alternate pronunciations by substituting a substitute phone having the highest-phone probability for the lowest-probability phone in the highest-scoring set of initial pronunciations, one or more sets of alternate pronunciations are generated wherein each set of alternate pronunciations includes the highest-scoring set of initial pronunciations having a unique substitute phone replacing the lowest-probability phone. For example, recall that in the in the set of initial pronunciations [* n a n T] [s a n k *r], phone "a" in [s a n k *r] was identified as the lowest-probability phone, P(a|X_a)=0.01. Sets of alternate pronunciations for [* n a n T] [s a n k *r] may include [* n a n T] [s * n k *r], [* n a n T] [s ! n k *r], [* n a n T] [s A n k *r], and [* n a n T] [s i n k *r] with the phones "*", "!", "A", and "i" substituted for "a".

Figure 7:
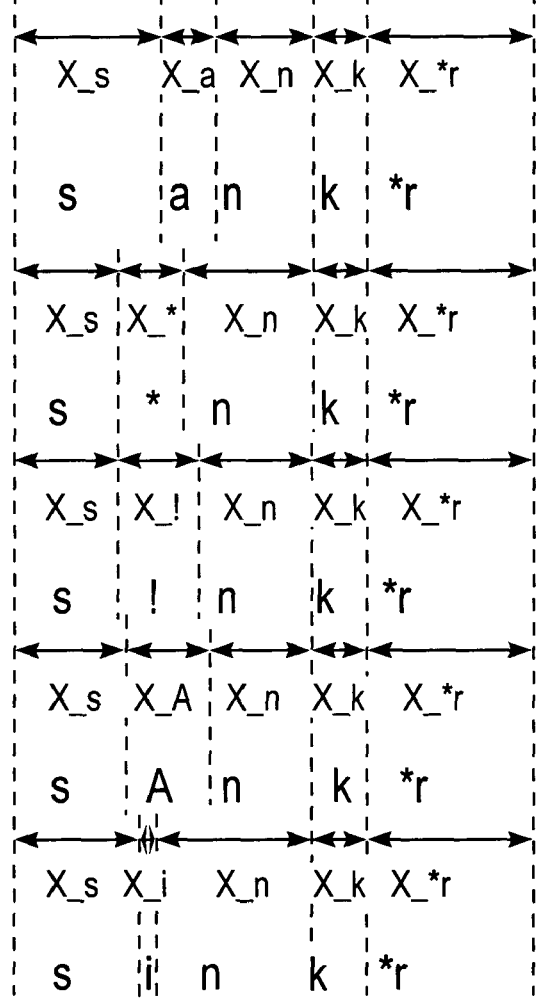
FIG. 7 is a diagram of sets of alternate pronunciations realigned to a waveform.

After sets of alternate pronunciations are generated, each set of alternate pronunciations is realigned to the waveform. In realigning sets of alternate pronunciations to the waveform, the acoustic segments may be realigned. In other words, the beginnings and endings of the acoustic segments may be adjusted. FIG. 7 shows alternate pronunciations [s * n k *r], [s ! n k *r], [s A n k *r], and [s i n k *r] realigned to waveform 305b. As an alternative to force-aligning sets of alternate pronunciations to a waveform, the sets of alternate pronunciations may be graphed (see FIG. 6B).

Subsequent to realignment or graphing, sets of alternate pronunciations are scored by scoring module 425 (scoring is discussed in detail below) or scored by ASR system 655. For example, scores for sets of alternate pronunciations of Ananth Sankar may include: [* n a n T] [s a n k *r] 0.3, [* n a n T] [s * n k *r] 2.7, [* n a n T] [s ! n k *r] −7.6, [* n a n T] [s A n k *r] 1.2, and [* n a n T] [s i n k *r] −8.0. Subsequent to scoring, a set of alternate pronunciations having the highest score may be added to the pronunciation dictionary. In the example being considered, the set of alternate pronunciations [* n a n T] [s ! n k*r] has the highest score and may be added to the pronunciation dictionary. Alternatively, if none of the sets of alternate pronunciations has a score higher than that of the highest-scoring set of initial pronunciations or higher than the score of the highest-scoring set of initial pronunciations plus a threshold value, none of the sets of alternate pronunciations are added to the pronunciation dictionary. The above-described process may be repeated using a set of alternate pronunciations having the highest score as a set of initial pronunciations to generate new sets of alternate pronunciations. The above process may also be repeated for each acoustic sample of words supplied in the transcribed acoustic data. Moreover, the above process may be repeated for a number of initial pronunciations in a set of initial pronunciations. For example, in the set of initial pronunciations [* n a n T] [s a n k *r], the pronunciation [s a n k *r] had the lowest-probability phone and alternate pronunciations were generated for this initial pronunciation. Alternate pronunciations may also be generated for the initial pronunciation [* n a n T] as described above. This processes may be repeated for each initial pronunciation in a set of initial pronunciations or for a select subset of the initial pronunciations in a set of initial pronunciations.

According to another embodiment, a set of alternate pronunciations is generated by deleting a lowest-probability phone from a set of initial pronunciations. For example, in the set of initial pronunciations [* n a n T] [s a n k *r], phone "a" is the lowest-probability phone and may be deleted to generate a set of alternate pronunciations [* n a n T] [s n k *r]. The set of alternate pronunciations is then realigned to the waveform or graphed. The set of initial and alternate pronunciations is then scored, and the set of alternate pronunciations may be added to the pronunciation dictionary if the score for the set of alternate pronunciations is higher than the score for the highest-scoring set of initial pronunciations or higher than the score for the highest-scoring set of initial pronunciations plus a threshold value. The process of deleting a lowest-probability phone may be repeated by using the set of alternate pronunciations as a set of initial pronunciations. The above process may also be repeated for each acoustic sample of words supplied in the transcribed acoustic data.

According to another embodiment, sets of alternate pronunciations are generated by inserting one or more phones adjacent to a lowest-probability phone in the highest-scoring set of initial pronunciations. For example, in the set of initial pronunciations [* n a n T] [s a n k *r], phone "a" is the lowest-probability phone. Various phones may be inserted adjacent to "a" to form sets of alternate pronunciations that may include: [* n a n T] [s ! a n k *r], [* n a n T] [s * a n k *r], [* n a n T] [s a ! n k *r], and [* n a n T] [s a * n k *r]. Each set of alternate pronunciations is then realigned to the waveform or graphed. The sets of alternate pronunciations are then scored. The set of alternate pronunciations having the highest score may then be added to the pronunciation dictionary. Alternatively, if none of the sets of alternate pronunciations has a score higher than the score for the highest-scoring set of initial pronunciations or higher than the score for the highest-scoring set of initial pronunciations plus a threshold value, none of the sets of alternate pronunciations may be added to the pronunciation dictionary.

The above described process of inserting phones adjacent to a lowest-probability phone may be repeated, for example, a set of alternate pronunciations that has a highest score may be used as a set of initial pronunciations. The above process may also be repeated for each acoustic sample of words supplied in the transcribed acoustic data.

According to another embodiment, sets of alternate pronunciations are generated from a highest-scoring set of initial pronunciations by combining the steps of (1) substituting an alternate phone for a lowest-probability phone, (2) deleting a lowest-probability phone, (3) inserting a phone adjacent to the lowest-probability phone, (4) substituting a lowest-probability phone with a sequence of two phones, (5) substituting a lowest-probability phone and its right neighboring phone with a substitute phone, (6) substituting a lowest-probability phone and its left neighbor with a substitute phone. Each set of alternate pronunciations is then realigned to a waveform or graphed and scored. As described above, a set of alternate pronunciations having the highest score, a score higher than that of the set of initial pronunciations, or a score higher than the score of the set of initial pronunciations plus a threshold value is then added to the pronunciation dictionary. Any combination of the steps (1)- (6) may be combined to generate sets of alternate pronunciations. Further, any combination of steps (1)- (6) may be repeated using a highest scoring set of alternate pronunciations as a set of initial pronunciations to generate new sets of alternate pronunciations. Further, any combination of steps (1)- (6) may be repeated for each acoustic sample of words supplied in the transcribed acoustic data.

The following description provides an overview of pronunciation scoring. According to one embodiment, scores are logarithm probabilities that include contributions for an acoustic part of a model and a linguistic part of the model. According to one embodiment, a score for a pronunciation is calculated according to the following model:

$$logP(B_i|A, X) = \gamma log \frac{P(X|B_i)}{P(X|A)} + (1-\gamma)logP(B_i|A).$$

"A" is a phone sequence of an initial pronunciation aligned to a waveform. "$B_i$" is a phone sequence of an alternate pronunciation. "X" is a sequence of acoustic observations corresponding to a waveform, such as that included in the transcribed acoustic data 215. And, "$\gamma$" is a weighting factor that may be used to emphasize or deemphasize the contributions of the acoustic part (first term) and linguistic part (second term) of the model. The weighting factor "$\gamma$" will be described in further detail below. While, "A" and "$B_i$" have been characterized as phone sets of an initial pronunciation and an alternate pronunciation, each may also represent phone sets for a set of initial pronunciations and a set of alternative pronunciations, respectively, that include more than one pronunciation.

The first term $$log \frac{P(X|B_i)}{P(X|A)}$$

in the model is a log of a likelihood ratio of the probability of the alternate pronunciation divided by the probability of the initial pronunciation. A relatively large ratio indicates the sequence of acoustic observations X has a relatively high probability of acoustic match to alternate pronunciation $B_i$ as compared to that of initial pronunciation A. The second term $P(B_i|A)$ represents a transformation probability that individual phone substitutions, phone deletions, and/or phone additions are statistically valid in view of previously observed similar phone substitutions, phone deletions, and/or phone additions. The second term is presently described in further detail.

The second term $P(B_i|A)$ represents a probability of pronunciation transformation, such as the generation of an alternate pronunciation $B_i$ via phone substitutions, phone deletions, and/or phone additions to an initial pronunciation A. For example, an initial pronunciation of the word "Peter" may be phonetically spelled as A=[p i ! *r]. An example of an alternate pronunciation of A that may have a relatively large probability $P(B_i|A)$ is $B_i$=[p i t *r]. An example of an alternate pronunciation of A that may have a relatively low probability (e.g., $P(B_i|A)$=0.0) is $B_i$=[k i t *r]. Substituting a "p" sound in Peter for a "k" sound ("k" sound as in cat) may not be statistically valid (or "reasonable") as a speaker will not pronounce Peter/[p i ! *r] as Keter/[k i t *r]. To provide a reasonable model (or "basis") for the second term $P(B_i|A)$, known phone substitutions, phone deletions, and phone additions from a set of pronunciations, which has been validated by a linguist, are counted and probabilities generated therefrom.

Figure 8:
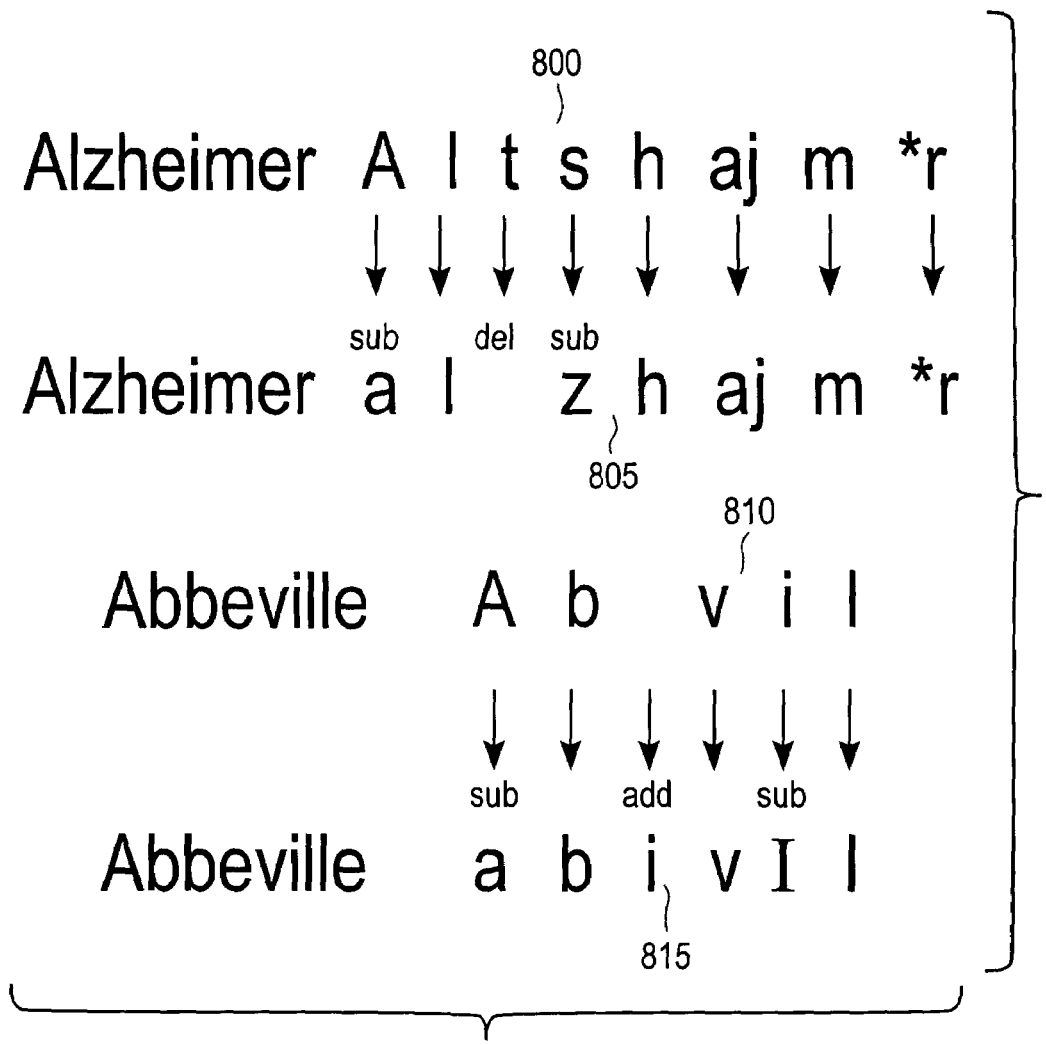
FIG. 8 is a diagram of a set of aligned pronunciations according to an embodiment of the present invention.

Prior to accumulating counts for phone substitutions, deletions, and additions, phone sequences for various pronunciations of a word are aligned. FIG. 8 shows the alignment of pronunciations 800 and 805 for the word Alzheimer's and pronunciations 810 and 815 for the word apple. Alignments may be performed according to a dynamic programming alignment similar to that described in "Modeling Pronunciations Variation in Conversational Speech Using Syntax and Discourse," by R. Bates and M. Ostendorf, published in the Conference Proceedings of the *Workshop on Prosody in Speed Recognition and Understanding*, pages 17-22 (2001), which is incorporated by reference in its entirety for all purposes.

Two types of counts may be accumulated to formulate the basis for $P(B_i|A)$, "context-independent counts" and "context-dependent counts." Context-independent counts are accumulated without consideration of the phones adjacent to a phone that is substituted, deleted, and/or added to a pronunciation. Context-dependent counts are accumulated taking into consideration phones adjacent to a phone that is substituted, deleted, and/or added to a pronunciation. For example, multiple pronunciations of the words Alzheimer's and Abbeville (see FIG. 8) may be included in pronunciation dictionary 220 and may have the pronunciations: [A l t s h aj m *r] and [a l z h aj m *r], and [A b v i l] and [a b i v I l], respectively. A context-independent count of the substitution of "a" for "A" is two as "l" and "b" following the "A" in [A l t s h aj m *r] and [A b v i l] are not taken into consideration in accumulating the context-independent count. In a context-dependent count for the substitution of "a" for "A" in view of a following "l", the context-dependent count is one. According to the example, the substitution of "a" for "A" in the pronunciations [A b v i l] and [a b i v I l] is not added to the context-dependent count because "b", and not "l", follows "A". Similar context-independent and context-dependent counts may be accumulated for the deletions of phones, such as the deletion of "t" from the first pronunciation of Alzheimer's 800. Similar context-independent and context-dependent counts may also be accumulated for the addition of phones, such as that addition of "i" in the second pronunciation [a b i v I l] 815. Similar context-independent and context-dependent counts may also be accumulated for the substitution of a lowest-probability phone with a sequence of two phones. Similar context-independent and context-dependent counts may also be accumulated for the substitution a lowest-probability phone and its right neighboring phone with a substitute phone. Similar context-independent and context-dependent counts may also be accumulated for the substitution a lowest-probability phone and its left neighbor with a substitute phone.

According to one embodiment, context-dependent counts may also be accumulated for linguistic properties. Linguistic properties include, for example, nasal and voiced linguistic properties. To accumulate context-dependent counts for linguistic properties, each context phone is decomposed into a set of linguistic properties, for example, phone "a" may be nasal (+/−) or voiced (+/−). According to one embodiment, context phones may be decomposed into thirteen unique linguistic properties. Subsequent to decomposition, context-dependent counts for a phone may be accumulated in view of a surrounding phone's linguistic properties. For example, any observed phone substitution (such as in the pronunciation dictionary) of x[b]y→x[d]y where x is a nasal and y is not a nasal will contribute to a context-dependent count of the substitutions of phone "b" for phone "d" in view of a leading nasal linguistic property and following non-nasal linguistic property. In the foregoing example, "x", "y", "b", and "d" represent any arbitrary phones in a phonetic alphabet. Similarly, context-dependent counts may be accumulated for a phone substitution of a phone "b" for "d" whose left phone "x" is nasal and voiced and whose right phone, y, is non-nasal and voiced. The probability P(x[b]y→x[d]y) for the substitution of "b" for "d" will be a combination of two probabilities one for P(+[b]−→+[d]−) along the nasal dimension, and P(+[b]+→+[d]+) along the voicing dimension. It should be understood that nasal, non-nasal, and voice are examples of useful linguistic properties and that context-dependent counts may be accumulated for nearly any combination of linguistic properties.

Subsequent to the accumulation of sets of context-independent counts and context-dependent counts, the counts are transformed into context-independent and context-dependent phone transformation probabilities $P_{ci}$(b|d) and $P_{cd}$(a[b]c|a[d]c), respectively. Phones "a", "b", "c", and "d" represent any arbitrary phones. $P_{ci}$(b|d) represent a context-independent probability of substituting phone b for d. And $P_{cd}$(a[b]c|a[d]c) represents a context-dependent probability of substituting phone "b" for "d" in the presence of a leading phone "a" and a trailing phone "c". Phone "a" or "c" may be an empty phone if phone "b" is the first or last phone in a pronunciation. A generalized formulation that combines the context-independent and context-dependent probabilities may be written as:

$$P_{total}(a[b]c|a[d]c)=\alpha P_{cd}(a[b]c|a[d]c)+(1-\alpha)P_{ci}(b|d)$$

in which $\alpha$ is a smoothing constant that is a function of the counts. Smoothing constant $\alpha$ may be written as:

$$\alpha=C(a[d]c)/(C(a[d]c)+\text{constant}).$$

C(a[d]c) is the context-dependent count of the number of times phone "d" appears between phones "a" and "c". For notational convenience, $P_{total}$(a[b]c|a[d]c) may simply be rewritten as $P(B_i|A)$.

According to one embodiment, words that are represented by multiple pronunciations in pronunciation dictionary 220 are used to form the basis of the second term $P(B_i|A)$. Alternatively, any set of pronunciations that have been verified by a linguist may be of use to form the basis of the second term of the model.

As briefly discussed above, the weighting factor "γ" may be used to emphasize or deemphasize the contributions of the first and second terms of the model:

$$logP(B_i|A, X) = \gamma \log \frac{P(X|B_i)}{P(X|A)} + (1-\gamma)logP(B_i|A).$$

γ is constrained to values of 0 to 1 inclusive. Relatively higher values of γ place an emphasis on the acoustic part of the model (first term) and relatively lower values of γ place an emphasis on the linguistic part of the model (second term). Use of relatively high values of γ (e.g., approximately 1) cause pronunciations to be generated that may not be reasonable whereas relatively low values of γ (e.g., approximately 0) limit the total number of pronunciations generated. According to one embodiment, γ is not set equal to 0 or 1. According to a further embodiment, y is set between 0.1 and 0.5.

The following discussion provides a simplified overview for generating model:

$$logP(B_i|A, X) = \gamma \log \frac{P(X|B_i)}{P(X|A)} + (1-\gamma)logP(B_i|A).$$

according to an embodiment of the present invention. A pronunciation "B*" is sought whose probability is approximately optimized given the initial pronunciation "A" and acoustic observations "X". Pronunciation "B*" may be written as:

$$B^* = \underset{Bi}{\mathrm{argmax}}\, P(Bi|A, X)$$

As "A" and "X" are givens for the optimization problem, it is assumed they are independent. Inverting the equation, making use of the independence assumption, and regrouping terms, the equation may be written as follows:

$$P(B_i|A, X) = \frac{P(A, X|B_i)P(B_i)}{P(A|X)}$$
$$= \frac{P(A|B_i)P(X|B_i)P(B_i)}{P(A|X)P(A)}$$
$$= \frac{P(X|B_i)}{P(X|A)}P(Bi|A).$$

Taking the log of both sides and introducing the weighting factor γ, the last equation above can be recast as the model:

$$logP(B_i|A, X) = \gamma \log \frac{P(X|B_i)}{P(X|A)} + (1-\gamma)logP(B_i|A).$$

Figure 9:
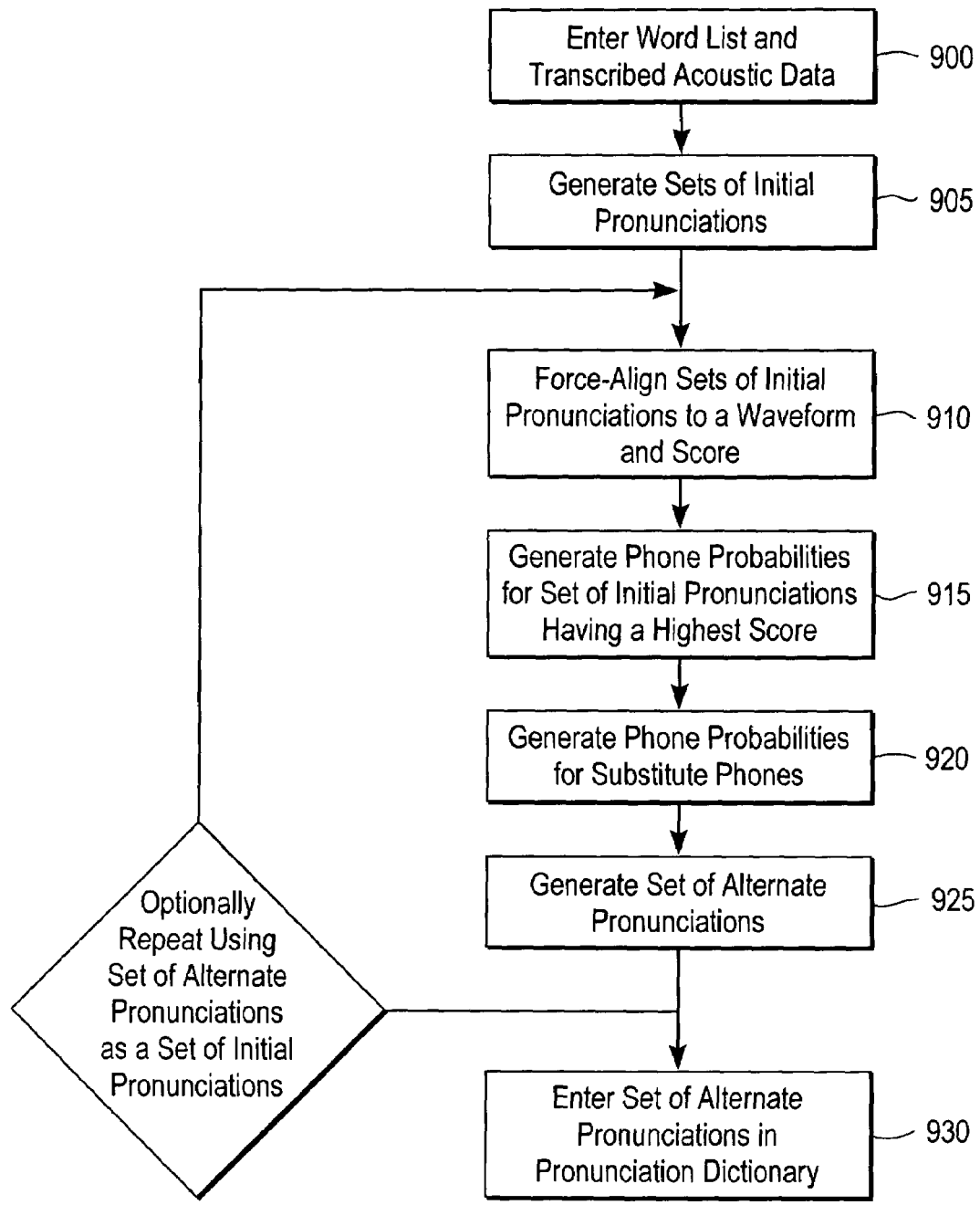
FIG. 9 is a high-level flow chart illustrating steps involved in generating pronunciations of words given a word list and a set of transcribed acoustic data according to an embodiment of the present invention.

FIG. 9 is a high-level flow chart illustrating steps involved in generating pronunciations for words in a word list and a set of transcribed acoustic data that includes waveforms for the word collected from utterances spoken by a set of speakers according to an embodiment of the present invention. The transcribed acoustic data may include transcriptions of the utterances that are (1) transcribed by hand (e.g., by a linguist), (2) transcribed by an ASR system, and/or (3) generated by an ASR system that seeks confirmation from a speaker that the speech recognized by the ASR system is what the speaker said. It should be realized that the steps shown in FIG. 9 are not limiting on the invention as recited in the claims, but are illustrative of an exemplary embodiment. Other techniques having fewer, substitute, and/or additional steps are within the purview of the invention and will be readily apparent to those of skill in the art. At 900, a word list and transcribed acoustic data are received by a pronunciation-learning module, which is configured to generate pronunciations of the words for entry in a pronunciation dictionary. The transcribed acoustic data may be generated from utterances spoken by a set of speakers. The utterances may then be transcribed by hand (e.g., by a linguist), transcribed by an ASR system, and/or generated by an ASR system that seeks feedback from a speaker that the speech recognized is what the speaker said. At 905, sets of initial pronunciations may be constructed from initial pronunciations generated by a letter-to-phone engine and/or extracted from a pronunciation dictionary. Phones used to phonetically spell pronunciations may include phones of nearly any useful phonetic alphabet, such as the IPA shown in Table 1. At 910, the sets of initial pronunciations are force-aligned to a waveform and scored. The waveform includes an acoustic representation of the words. At 915, a phone probability for each phone in a highest-scoring set of initial pronunciations is generated and a lowest-probability phone is identified. At 920, phone probabilities are generated for a set of substitute phones. The set of substitute phones may include all of the phones in a phonetic alphabet or a subset thereof. At 925, a substitute phone having a highest-phone probability is then substituted for the lowest-probability phone to generate a set of alternate pronunciations. At 930, a highest-scoring set of alternate pronunciations is added to the pronunciation dictionary. Steps 910-925 may optionally be repeated using the set of alternate pronunciations as the set of initial pronunciations to generate new sets of alternate pronunciations, and thus further refine the acoustic match of the sets of alternate pronunciations to the waveform. Steps 900-930 may be repeated for each waveform included in the transcribed acoustic data. Repeating steps 900-930 for each waveform provides that a variety of speakers may be recognized as having spoken a word by an ASR system configured to use the generated pronunciation dictionary.

Figure 10:
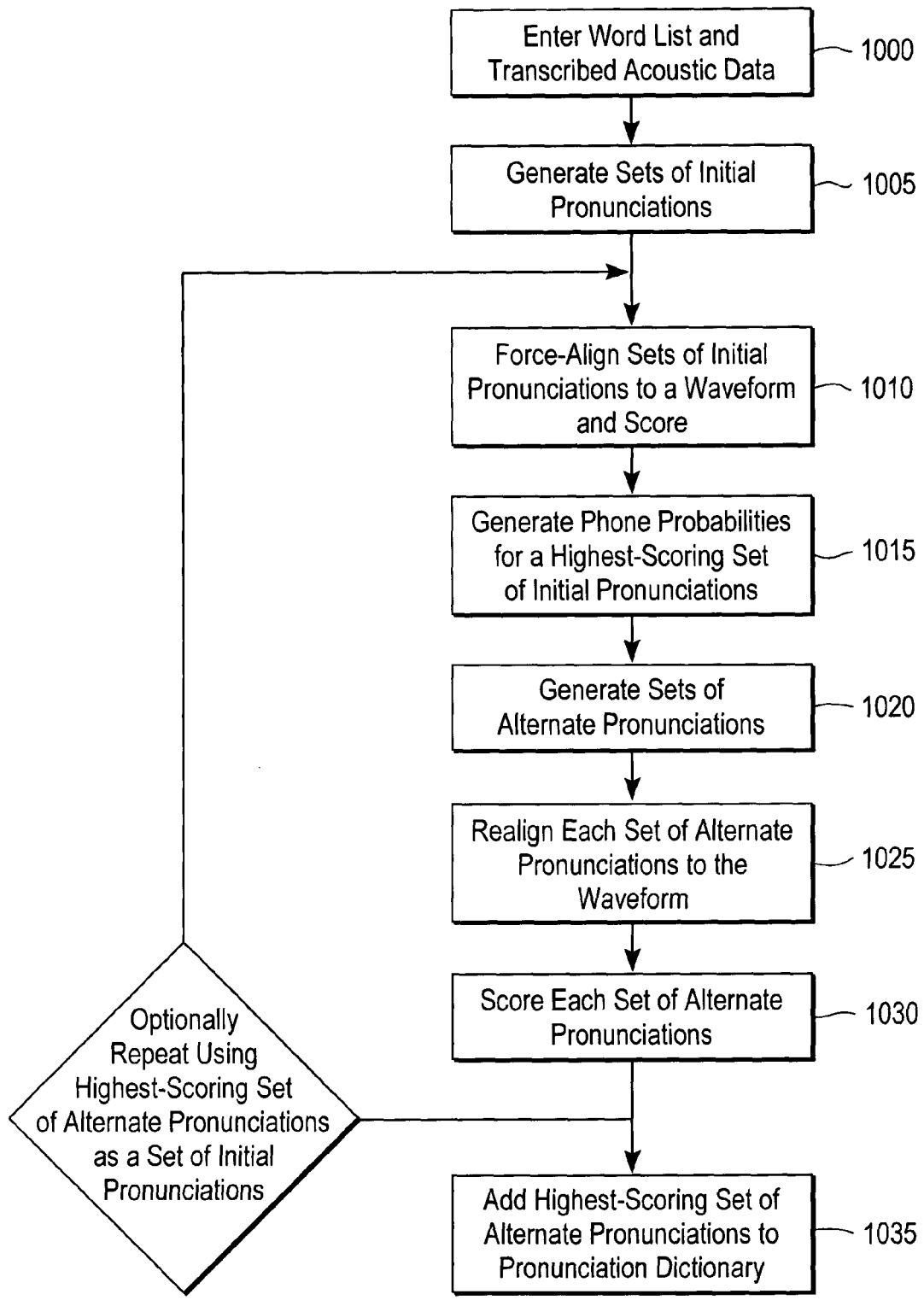
FIG. 10 is a high-level flow chart illustrating steps involved in generating pronunciations of words given a word list and a set of transcribed acoustic data according to another embodiment of the present invention.

FIG. 10 is a high-level flow chart illustrating the steps involved in generating alternate pronunciations for words in a word list and a set of transcribed acoustic data that includes waveforms for the word collected from utterances spoken by a set of speakers, according to another embodiment of the present invention. As in embodiments discussed above, the transcribed acoustic data may include transcriptions of the utterances that are (1) transcribed by hand (e.g., by a linguist), (2) transcribed by an ASR system, and/or (3) generated by an ASR system that seeks confirmation from a speaker that the speech recognized by the ASR system is what the speaker said. It should be realized that the steps shown in FIG. 10 are not limiting on the invention as recited in the claims, but are illustrative of an exemplary embodiment. Other techniques having fewer, substitute, and/or additional steps are within the purview of the invention and will be readily apparent to those of skill in the art. At 1000, the word list and transcribed acoustic data are received by a pronunciation-learning module, which is configured to generate pronunciations of the words for entry in a pronunciation dictionary. At 1005, sets of initial pronunciations may be constructed from initial pronunciations generated by a letter-to-phone engine and/or extracted from a pronunciation dictionary. At 1010, the sets of initial pronunciations are force-aligned to a waveform and scored. The waveform includes an acoustic representation of the word. At 1015, a phone probability for each phone in a highest-scoring set of initial pronunciations is generated and a lowest-probability phone is identified. At 1020 sets of alternate pronunciations are generated from the highest-scoring set of initial pronunciations by performing one or more of the following: (1) substituting a unique phone for the lowest-probability phone, (2) deleting the lowest-probability phone, (3) inserting a phone adjacent to the lowest-probability phone, (4) substituting a sequence of two phones for the lowest-probability phone, (5) substituting a substitute phone for the lowest-probability phone and its right neighboring phone, (6) substituting a substitute phone for the lowest-probability phone and its left neighboring phone. At 1025 each set of alternate pronunciations is realigned (i.e., force-aligned) to the waveform. At 1030 a score is generated for each of the sets of alternate pronunciations. Pronunciation scoring is described in detail above. At 1035, the set of alternate pronunciations having the highest score is identified and added to a pronunciation dictionary. Alternatively, subsequent to identifying the set of alternate pronunciations having the highest scoring and determining that the highest score is higher than the score of the highest-scoring set of initial pronunciations, the acoustic score component $$\left(i.e., \log\frac{P(X \mid B_i)}{P(X \mid A)}\right)$$

of the highest score is compared to a threshold value. If the acoustic score component is above the threshold value, then the set of alternate pronunciations is added to the pronunciation dictionary. The check provides that the set of alternate pronunciations having the highest score (from an acoustic point of view) has a relatively higher acoustic match to the waveform than the highest-scoring set of initial pronunciations. According to one embodiment, steps 1010-1030 may optionally be repeated using the set of alternate pronunciations as a set of initial pronunciations. According to another embodiment, steps 1000-1035 may be repeated for each waveform in the transcribed acoustic data.

Figure 11:
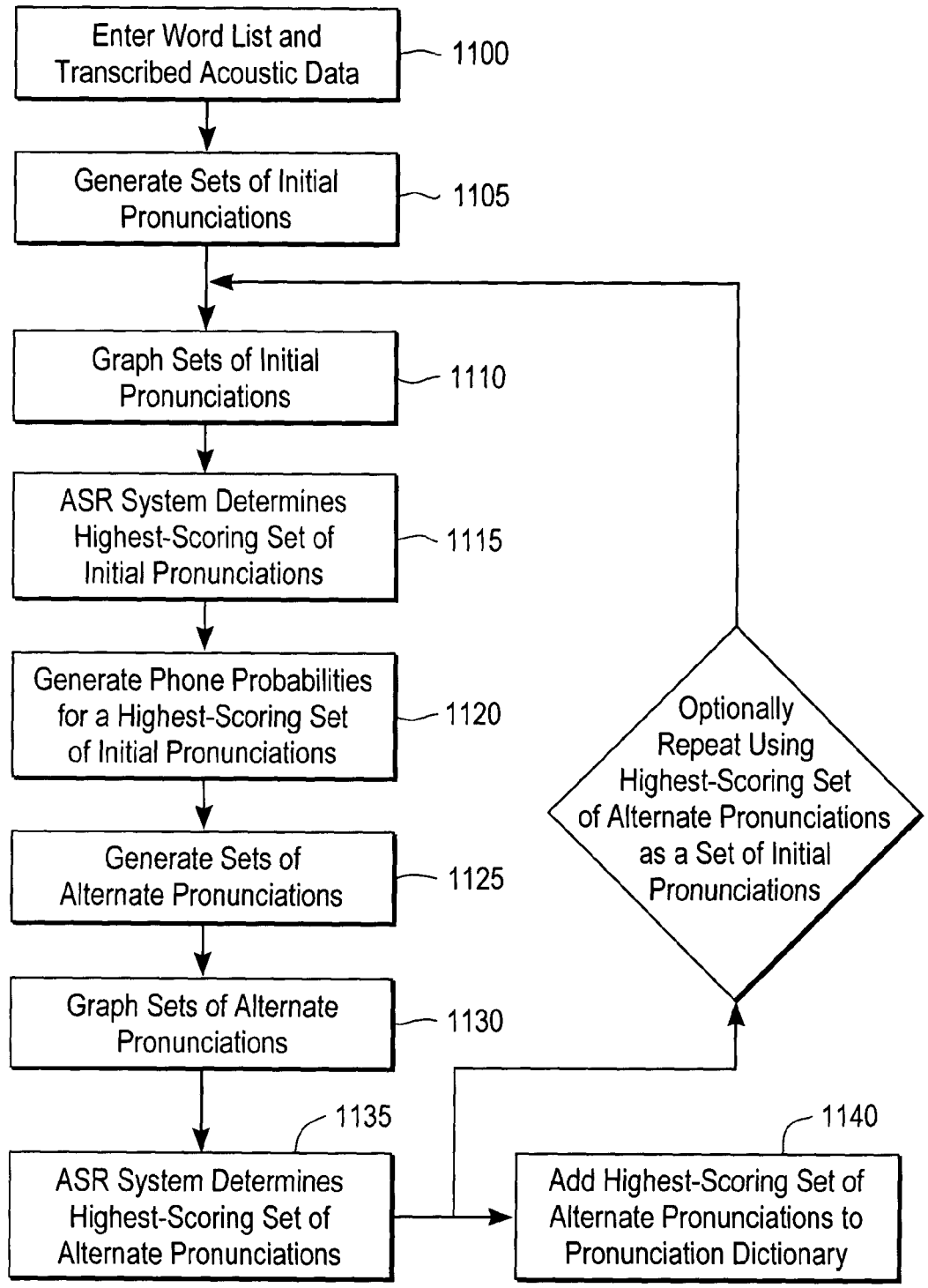
FIG. 11 is a high-level flow chart illustrating steps involved in generating pronunciations of words given a word list and a set of transcribed acoustic data according to another embodiment of the present invention.

FIG. 11 is a high-level flow chart illustrating the steps involved in generating words in a word list and a set of transcribed acoustic data that includes waveforms for the words collected from utterances spoken by a set of speakers according to another embodiment of the present invention. As in embodiments discussed above, the transcribed acoustic data may include transcriptions of the utterances that are (1) transcribed by hand (e.g., by a linguist), (2) transcribed by an ASR system, and/or (3) generated by an ASR system that seeks confirmation from a speaker that the speech recognized by the ASR system is what the speaker said. It should be realized that the steps shown in FIG. 11 are not limiting on the invention as recited in the claims, but are illustrative of an exemplary embodiment. Other techniques having fewer, substitute, and/or additional steps are within the purview of the invention and will be readily apparent to those of skill in the art. At 1100, the word list and transcribed acoustic data are received by a pronunciation-learning module, which is configured to generate pronunciations of the words for entry in a pronunciation dictionary. At 1105, sets of initial pronunciations matching given transcribed words in the transcribed acoustic data are constructed from initial pronunciations generated by a letter-to-phone engine and/or extracted from a pronunciation dictionary. At 1110, the sets of initial pronunciations are graphed (see, for example, FIG. 6B). At 1115, an ASR system determines the highest-scoring set of initial pronunciations. According to one embodiment, linguistic probabilities $P(B_i|A)$ may be used as weights in the graph and used by the ASR system to determine the highest-scoring set of initial pronunciations. At 1120, for the set of initial pronunciations having the highest score, a phone probability for each phone in the set of initial pronunciations is generated and a lowest-probability phone is identified. At 1125 sets of alternate pronunciations are generated from the set of initial pronunciations having the highest score by performing one or more of the following: (1) substituting a unique phone for the lowest-probability phone, (2) deleting the lowest-probability phone, (3) inserting a phone adjacent to the lowest-probability phone, (4) substituting a sequence of two phones for the lowest-probability phone, (5) substituting a substitute phone for the lowest-probability phone and its right neighboring phone, (6) substituting a substitute phone for the lowest-probability phone and its left neighboring phone. At 1130, the sets of alternate pronunciations are graphed. At 1135, an ASR system determines the set of alternate pronunciations having the highest score. According to one embodiment, linguistic probabilities $P(B_i|A)$ may be used as weights in the graph and used by the ASR system to determine the set of alternate pronunciations having the highest score. At 1140, the highest-scoring set of alternate pronunciations is added to a pronunciation dictionary. According to one embodiment, steps 1110-1135 may optionally be repeated using the highest-scoring set of alternate pronunciations as a set of initial pronunciations. According to another embodiment, steps 1100-1140 may be repeated for each waveform in the transcribed acoustic data and matches the given transcribed words.

Sets of alternate pronunciations generated by repeating steps 1000-1035 and steps 1100-1140 may include duplicate sets of alternate pronunciations. Prior to adding one or more sets of alternate pronunciations to the pronunciation dictionary, the number of sets of alternate pronunciations may be reduced based on a set of useful criteria. For example, duplicate sets of alternate pronunciations (e.g., [b o f A i], [b o f A i], [b o f A i], ... etc.) may be counted. A set of alternate pronunciations that does not occur more than a threshold number of times may be removed from the sets of alternate pronunciations, or, if a set of alternate pronunciations is duplicated more than a threshold number of times, the duplicated set of alternate pronunciations may be added to the pronunciation dictionary. Alternatively, a set of alternate pronunciations that is not duplicated more than a set percentage of occurrences may be discarded from the sets of alternate pronunciations or a set of alternate pronunciations that is duplicated more than a set percentage of occurrences may be added to the pronunciation dictionary. The above criteria for discarding and adding sets of alternate pronunciations to a pronunciation dictionary may be used in any combination.

It is to be understood that the examples and embodiments described above are for illustrative purposes only and that various modifications or changes in light thereof will be suggested to persons skilled in the art and are to be included within the spirit and purview of this application and scope of the appended claims. For example, while embodiments have been described herein for generating pronunciations for ASR systems, generated pronunciations may also be used by text-to-speech systems. Therefore, the above description should not be taken as limiting the scope of the invention as defined by the claims.

What is claimed is:

1. In a computer system, a method of generating pronunciations for a word that is represented by a waveform and text, such that the pronunciations are spelled by phones in a phonetic alphabet for storage in a pronunciation dictionary, the method comprising:
   a. graphing sets of initial pronunciations; thereafter
   b. in an ASR subsystem determining a highest-scoring set of initial pronunciations;
   c. generating sets of alternate pronunciations, wherein each set of alternate pronunciations includes the highest-scoring set of initial pronunciations with a lowest-probability phone of the highest-scoring initial pronunciation substituted with a unique-substitute phone;
   d. graphing the sets of alternate pronunciations;
   e. determining in the ASR subsystem a highest-scoring set of alternate pronunciations; and
   f. adding to a pronunciation dictionary the highest-scoring set of alternate pronunciations.

2. The method of claim 1, wherein step a. includes weighting the sets of initial pronunciations with linguistic probabilities.

3. The method of claim 2, wherein linguistic probabilities are calculated according to a transformation probability $P(B_i|A)$, wherein $B_i$ and A represent respective sequence of phones for respective sets of pronunciations.

4. The method of claim 1, wherein step d. includes weighting the sets of alternate pronunciations with linguistic probabilities.

5. The method of claim 4, wherein linguistic probabilities are calculated according to a transformation probability $P(B_i|A)$, wherein $B_i$ and A represent respective sequence of phones for respective sets of pronunciations.

6. The method of claim 1 further comprising in the ASR subsystem traversing branches of graphs of the sets of initial and alternate pronunciations to generate scores for the sets of initial and alternate pronunciations.

7. The method of claim 1 further comprising in the ASR subsystem generating transcriptions of acoustic data spoken by a plurality of speakers, wherein the transcriptions are included in the transcribed acoustic data.

8. The method of claim 7 further comprising in the ASR subsystem collecting feedback from the plurality of speakers to affirm or disaffirm correct generation of the transcriptions, wherein if the transcriptions are affirmed as correct then the transcriptions are entered in the transcribed acoustic data.

9. The method of claim 1 further comprising
   g. generating a phone probability for each phone in the highest-scoring set of initial pronunciations, wherein the lowest-probability phone has a lowest-phone probability.

10. The method of claim 1, further comprising:
    g. generating the sets of initial pronunciations from initial pronunciations generated by a letter-to-phone engine and/or extracted from the pronunciation dictionary.

11. The method of claim 1, wherein steps a., b., c., d., e., and f. are repeated for each waveform of a plurality of waveforms that represent the word.

12. The method of claim 1, wherein steps c., d., and e. are repeated using the highest-scoring set of alternate pronunciations as the highest-scoring set of initial pronunciations.

13. The method of claim 1, wherein the sets of alternate pronunciations include a set of alternate pronunciations that include the highest-scoring initial pronunciation with the lowest-probability phone removed.

14. The method of claim 1, wherein the sets of alternate pronunciations include additional sets of alternate pronunciations that include the highest-scoring initial pronunciation having a unique phone inserted adjacent to the lowest-probability phone.

15. The method of claim 1, wherein the sets of alternate pronunciations include additional sets of alternate pronunciations that include the highest-scoring initial pronunciation having a sequence of two phones substituted for the lowest-probability phone.

16. The method of claim 1, wherein the sets of alternate pronunciations include additional sets of alternate pronunciations that include the highest-scoring initial pronunciation having the lowest-probability phone and a right neighboring phone substituted with a unique phone.

17. The method of claim 1, wherein the sets of alternate pronunciations include additional sets of alternate pronunciations that include the highest-scoring initial pronunciation with the lowest-probability phone and a left neighboring phone substituted with a unique phone.

18. The method of claim 1, further comprising:
    g. adding the highest-scoring set of initial pronunciations to the pronunciation dictionary.

19. In a computer system, a method of generating pronunciations for a word that is represented by a waveform and text, such that the pronunciations are spelled by phones in a phonetic alphabet for storage in a pronunciation dictionary, the method comprising:
    a. graphing sets of initial pronunciations; thereafter
    b. in an ASR subsystem determining a highest-scoring set of initial pronunciations;
    c. generating a set of alternate pronunciations that includes the highest-scoring set of initial pronunciations with a lowest-probability phone of the highest-scoring initial pronunciation substituted with a unique-substitute phone; and
    d. adding to a pronunciation dictionary the set of alternate pronunciations and the highest-scoring set of initial pronunciations.

20. The method of claim 19, wherein step a. includes weighting the sets of initial pronunciations with linguistic probabilities.

21. The method of claim 20, wherein linguistic probabilities are calculated according to a transformation probability $P(B_i|A)$, wherein $B_i$ and A represent respective sequence of phones for respective sets of pronunciations.

22. The method of claim 19 further comprising in the ASR subsystem traversing branches of the graph to generate scores for the sets of initial pronunciations.

23. The method of claim 19 further comprising in the ASR subsystem generating transcriptions of acoustic data spoken by a plurality of speakers, wherein the transcriptions are included in the transcribed acoustic data.

24. The method of claim 23 further comprising in the ASR subsystem collecting feedback from the plurality of speakers to affirm or disaffirm correct generation of the transcriptions, wherein if the transcriptions are affirmed as correct then the transcriptions are entered in the transcribed acoustic data.

25. The method of claim 19 further comprising
    e. generating a phone probability for each phone in the highest-scoring set of initial pronunciations, wherein the lowest-probability phone has a lowest-phone probability.

26. The method of claim 19 further comprising:
   e. generating the sets of initial pronunciations from initial pronunciations generated by a letter-to-phone engine and/or extracted from the pronunciation dictionary.

27. The method of claim 19, wherein steps a., b., c., and d. are repeated for each waveform of a plurality of waveforms that represent the word.

28. The method of claim 19, wherein step c. is repeated using the set of alternate pronunciations as the highest-scoring set of initial pronunciations.

* * * * *